United States Patent Office 3,551,376
Patented Dec. 29, 1970

3,551,376
ADHESION-RESISTANT ORGANOPOLYSILOXANE COATINGS
Klaus Seyfried, Cologne, and Hans Toepsch, Opladen, Germany, assignors to Farbenfabriken Bayer Aktiengesellschaft, Leverkusen, Germany, a corporation of Germany
No Drawing. Filed June 13, 1968, Ser. No. 741,149
Claims priority, application Germany, June 28, 1967, F 52,816
Int. Cl. C08g 51/34
U.S. Cl. 260—32.8
6 Claims

ABSTRACT OF THE DISCLOSURE

An adhesion-resistant coating on the surface of an article is produced by applying to the surface a solution of (1) an essentially linear $\alpha,\omega$-di-hydroxy-polydiorganosiloxane having a viscosity greater than 500 cp. at 20° C. and, in a proportion of 1 to 25 percent by weight, referred to the polysiloxane, of (2) an alkoxysilyl-methylamino compound of the general formula

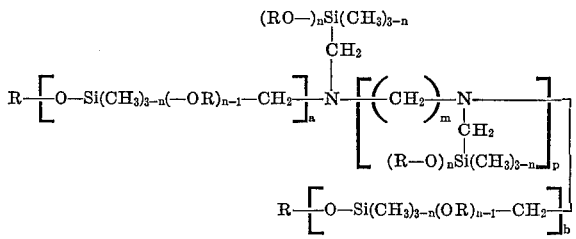

in (3) an inert solvent, and heating the film thus applied. In the formula $n$ is 1, 2 or 3, $a$ is zero or 1, $b$ is zero or 1, $m$ is an integer greater than 1, $p$ is zero or a positive integer at least equal to $3-n-a-b$, and R is R' R'—O—CH$_2$—CH$_2$—, or R'$_2$N—CH$_2$CH$_2$—, R' representing an alkyl radical containing 1 to 4 carbon atoms.

---

This invention relates to the production of adhesion-resistant coatings on the surfaces of articles, including rigid surfaces and elastic surfaces such as those of fibre materials, in order to reduce the adhesion of tacky or crust-forming substances thereto. The invention is especially concerned with the production of such coatings using organopolysiloxanes.

It has been known for some time to apply such coatings, for example, to baking pans, to castings or moulds for articles of synthetic resins or rubber, to packaging materials for tacky goods such as asphalt, and particularly to paper which is intended to be used for temporarily covering the adhesive side of self-adhesive films and tapes. In the last mentioned instance, as also in the case of some other applications, for example in the case of moulds for the production of foamed materials, it is required not only that the tacky material should be more easily detachable, but also that the siloxane film should firmly adhere to its substrate and that no interfering particles of the siloxane should enter the material which is in contact with the surface of the film. It is known that this so-called "migration stability" is achieved by cross-linking reactions within the siloxane film.

For this purpose there are preferably used as the coating materials polydialkyl siloxanes with terminal reactive substituents, such as hydroxyl or olefin radicals, optionally mixed with branched or resin-like organopolysiloxanes and, as cross-linking agents, tri-functional or higher polyfunctional silicon compounds, such as partially substituted siloxanes or alkoxy-silicon compounds to which cross-linking accelerators, for example metal or organo-metal carboxylates, amines or peroxides, are added. These mixtures are generally used in the dissolved state, the cross-linking being completed by heating the coating produced therefrom.

It is possible, in this way, to achieve the desired result, but the methods hitherto used for the purpose are in need of being improved. For example, the mixtures described above are only stable for a short period of time in the uncross-linked state, and therefore mixing devices and accurate control of the metering of the components are required at their place of use. Chiefly, however, the temperature/time conditions to be observed for a thorough cross-linking are unsatisfactory; at temperatures below 150° C. heating for more than one minute is necessary. However, for the continuous production of the coatings carried out in a machine, for example on paper, on tapes of fabrics or films of synthetic material, a shorter heat treatment is required since the heat-sensitivity of the material to be coated does not permit of any arbitrary increase in temperature for accelerating the cross-linking reaction. It is the object of the present invention to provide improved adhesion-resistant coatings.

According to the invention a process for the production on the surface of an article of an adhesion-resistant coating comprises applying to the surface a solution containing an essentially linear $\alpha,\omega$-dihydroxy-polydiorganosiloxane, preferably a -polydimethyl-siloxane, having a viscosity greater than 500 cp., preferably 10$^6$ to 10$^7$ cp., at 20° C., and a cross-linking agent in an inert solvent, preferably one boiling below 150° C., and heating the film thus applied, preferably to a temperature ranging from 80 to 120° C., wherein the cross-linking agent, used in an amount of 1 to 25, preferably 5 to 15, percent by weight, referred to the amount of polysiloxane, is an alkoxysilylmethylamino compound of the general formula

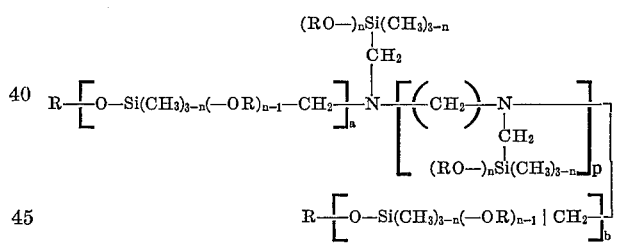

in which $n$ is 1, 2 or 3, $a$ is zero or 1, $b$ is zero or 1, $m$ is an integer greater than 1, preferably 2, $p$ is zero or a positive integer at least equal to $3-n-a-b$, and preferably smaller than 4, and R is R', R'—O—CH$_2$—CH$_2$— or R'$_2$N—CH$_2$—CH$_2$—, R' representing an alkyl radical containing 1 to 4 carbon atoms.

Examples of suitable solvents are toluene, xylene, benzine, chlorinated hydrocarbons and ketones. The polydiorganosiloxanes with terminal hydroxyl groups can be obtained, as is known, by polymerization of cyclic diorganosiloxanes in the presence of small amounts of water, or by a catalytic higher condensation of diorgano-dichlorosilane hydrolysates. Small amounts of trifunctional mono-organosiloxane units may also participate so that sporadic branchings result in the polymer, the structure of which should, however, remain essentially linear. When the viscosity of this polymer is more than 10$^6$ cp., as is preferred, it is advantageous initially to prepare a stock solution containing 200 to 500 g. thereof per litre. To this solution there may also be added, in known manner, other cross-linking polysiloxanes, for example methyl-hydrogen-polysiloxanes or resinous organopolysiloxanes which an influence the mechanical properties of the coatings and their adhesiveness on the substrate; this admixture is not, however, essential.

As a rule, the process is further carried out in such a manner that the initially prepared stock solution is diluted for use, preferably to a content of less than 150 g. per litre. The most obvious method is to dilute with the same solvent as that used for the preparation of the stock solution, but it may also be advantageous to change the solvent, selecting, for example for coating a synthetic material solvent components which superficially swell this synthetic material.

To the so-diluted solution is then added the cross-linking agent, advantageously dissolved in an approximately equal amount by weight of one of the above-mentioned solvents. Particularly suitable cross-linking agents are those having the formulae $$[(C_2H_5O-)_2Si(CH_3)-CH_2-]_3N$$

$$[(C_2H_5O-)_2Si(CH_3)-CH_2-]_2N-CH_2-CH_2$$
$$-N[-CH_2-Si(CH_3)(-OC_2H_5)_2]_2$$

and $$(C_2H_5O-)_2Si(CH_3)-CH_2-N(CH_3)-CH_2-CH_2$$
$$-N(CH_3)-CH_2-Si(CH_3)(-OC_2H_5)_2$$

The coating agent thus obtained is then applied to the surface to be coated according to known methods, for example by dipping, roll- or knife-coating. The solution can also be continuously spread onto films, sheets and tapes by means of one of the devices customarily used for such purposes, for example in the paper industry, followed by a passage through a drying oven.

If, for the production of the coating agent, no special steps are taken to keep the solution free from water, then its viscosity does not noticeably increase at room temperature, at least not during the first 4 hours. The duration of a constant viscosity varies with the type of solvent; it is shortest with chlorinated hydrocarbons, such as carbond tetrachloride or trichloroethylene, but it can amount to several days wiht toluene or benzine. However, if dehydrated solvents are used and access of atmospheric moisture is prevented during production and storage of the coating agent, then the latter remains usable for at least several months at room temperature and a little above. In a thin film heated to 80° C. or more, a complete cross-linking rapidly takes place while the solvent evaporates depending upon the degree of the temperature and the volatility of the solvent. For example, a completely cross-linked coating is formed from a solution in toluene as a 20 micron-thick film at 80° C. within 60 seconds, at 100° C. within 30 seconds, and at 120° C. within 15 seconds.

In contrast, solutions which contain, instead of the cross-linking agent to be used according to the invention, cross-linking agents of similar appearance and of a known type, but which do not exhibit the characteristic atom sequence

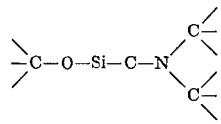

for example methyl-triacetoxysilane, a silylamine or a silyl derivative of a ketoxime, and which for the rest are of an analogous composition, require approximately four-times the heating time, even if a substance accelerating the cross-linking reaction, such as dibutyl-tin-diluarate, is added. The coating agents of the invention remains virtually as unchanged at room temperature and with the exclusion of moisture as the known agents, and retain when under atmospheric air their spreading property at least as long.

The following examples are given for the purpose of illustrating the invention.

EXAMPLE 1

Tris-(methyl-diethoxysilyl-methyl-amine of the formula $[(C_2H_5O-)_2Si(CH_3)-CH_2]_3N$ is prepared by dissolving 2270 g. methyl-(bromomethyl)-diethoxysilane in 4 litres acetonitrile, passing into this solution, at 80° C. for 12 hours, a current of 40 g. per hour of ammonia, filtering the solution, and evaporating from the fitrate the acetonitrile at 0.5 mm. Hg and a maximum temperature of 80° C. The residual product is mixed with an equal amount by weight of anhydrous toluene and the solution of the cross-linking agent thus obtained is used as follows.

A stock solution of approximately 40,000 cp. viscosity (at 20° C.) is first prepared from 4 kg. of an α,ω-dihydroxy-polydimethylsiloxane of approximately $10^6$ cp. viscosity (at 20° C.) and 6 kg. toluene. As required, 1 kg. of this solution is diluted with 4 kg. toluene and 100 g. of the solution of the cross-linking agent described above is mixed in.

The coating solution thus prepared is spread, by means of a glass coating-knife, as a film of about 10 microns thickness on Pergamyn having a weight per square metre of about 60 g. and the spread-coated paper is then heated at 120° C. for 15 seconds. The film then formed on the paper cannot be rubbed off; a strip of a self-adhesive film pressed on it can easily be torn off again and then struck on another substrate with an adhesiveness which is hardly reduced.

The same result is observed both, when the coating solution is spread on the paper after a lapse of 24 hours, and also if, instead of 100 g., only 50 g. of the cross-linking agent solution are used, otherwise carrying out the procedure as described above.

However, this result was not achieved when the cross-linking agent used in this example was replaced, in a series of comparative experiments, by the following silyl derivative of a carboxylic acid, amine, acylamide or ketoxime of similar structure, viz: methyltriacetoxysilane of the formula $$(C_2H_5-C(=O)-O-)_3Si-CH_3$$

methyltri-(cyclohexylamino)-silane of the formula $$(C_6H_{11}-NH-)_3Si-CH_3$$

methylethoxydi-(n-methylbenzamido)-silane of the formula $$[C_6H_5-C(=O)-N(CH_3)-]_2Si(CH_3)-OC_2H_5$$

or methyltri-(3 - methyl-1-oxa-2-azapenten-(2)-yl)-silane of the formula $$[C_2H_5-C(CH_3)=N-O-]_3Si-CH_3$$

When using these materials in exactly the way described above, especially regarding the quantitative proportions, there resulted in each case, after heating for 15 seconds, a tacky siloxane coating which could easily be rubbed off from the paper. Upon tearing off a strip of a self-adhesive film pressed on to the paper, parts of the siloxane coating and paper fibres adhered to the film which had been torn off.

In a further series of comparative experiments 1 percent by weight dibutyl-tin-dilaurate was admixed into the stock solution used in the example described, and otherwise the same procedure was followed as in the previous comparative experiments. The result was the same as that without the tin compound.

EXAMPLES 2 AND 3

The cross-linking agent used in Example 1 is replaced by the same amount by weight of (2) N,N,N',N',-tetrakis-(methyldiethoxy-silylmethyl)-ethylenediamine, and (3) N,N'-dimethyl - N,N'-bis - (methyldiethoxy-silylmethyl)-ethylenediamine of the formulae given in the general part of the description, and the procedure described in Example 1 is repeated. The results are in each case the same as those obtained according to Example 1.

EXAMPLE 4

1 kg. of the stock solution described in Example 1 and containing 40% siloxane is diluted with 6 kg. toluene, and 2 kg. toluene are distilled off from this solution for its dehydration. The residue is allowed to cool under anhydrous nitrogen, 50 g. of the cross-linking agent solution used in Example 1 are admixed thereinto, and the resulting coating solution is charged into a flask which is kept, tightly sealed, at room temperature for 2 months. One part is then withdrawn and Pergamyn coated therewith in the same manner as that described in Example 1. After the lapse of a further month, another part of the flask content is withdrawn and the coating process repeated. The properties of the resulting coatings are the same as those described in Example 1. No noticeable difference exists between the viscosity of the solution stored in the flask for 3 months and the viscosity of the original solution.

What is claimed is:

1. A solution comprising an essentially linear $\alpha,\omega$-dihydroxypolydiorganosiloxane having a viscosity greater than 500 cp. at 20° C., an inert solvent and a cross-linking agent which is an alkoxysilyl-methylamino compound of the general formula

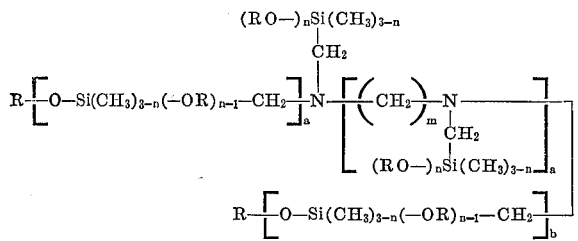

in which $n$ is an integer from 1 to 3, $a$ is zero or 1, $b$ is zero or 1, $m$ is an integer greater than 1, $p$ is zero or a positive integer at least equal to $3-n-a-b$, and R is selected from the group consisting of R′,

and $R'_2N-CH_2-CH_2-$, R′ representing an alkyl radical containing 1 to 4 atoms, and the proportion of said cross-linking agent being from 1 to 25 percent by weight referred to said polysiloxane.

2. A solution according to claim 1, wherein said $\alpha,\omega$-dihydroxypolydiorganosiloxane has a viscosity of $10^6$ to $10^7$ cp. at 20° C.

3. A solution according to claim 1 wherein said $\alpha,\omega$-dihydroxypolydiorganosiloxane is an $\alpha,\omega$-dihydroxy-polydimethylsiloxane.

4. A solution according to claim 1 wherein said inert solvent is one boiling below 150° C.

5. A solution according to claim 4 wherein said inert solvent is selected from the group consisting of toluene, benzene, xylene, a chlorinated hydrocarbon, and a ketone.

6. A solution according to claim 1 wherein said cross-linking agent is selected from the group consisting of tris-(methyldiethoxysilylmethyl) - amine, N,N,N′,N′ tetrakis-(methyldiethoxysilylmethyl)-ethylene-diamine, and N,N′-dimethyl-N,N′-bis(methyldiethoxy-silylmethyl) - ethylene diamine.

References Cited

UNITED STATES PATENTS

| | | |
|---|---|---|
| 3,311,651 | 3/1967 | Niederprum et al. 260—448.2(N) |
| 3,408,325 | 10/1968 | Hittmair et al. __ 260—46.5(G) |
| 3,464,951 | 9/1969 | Hittmair et al. 260—448.2(N)X |

MORRIS LIEBMAN, Primary Examiner

L. T. JACOBS, Assistant Examiner

U.S. Cl. X.R.

260—46.5

UNITED STATES PATENT OFFICE
CERTIFICATE OF CORRECTION

Patent No. 3,551,376          Dated Dec. 29, 1970

Inventor(s) Klaus Seyfried and Hans Toepsch

It is certified that error appears in the above-identified patent and that said Letters Patent are hereby corrected as shown below:

Col. 2, line 40, the formula should be:

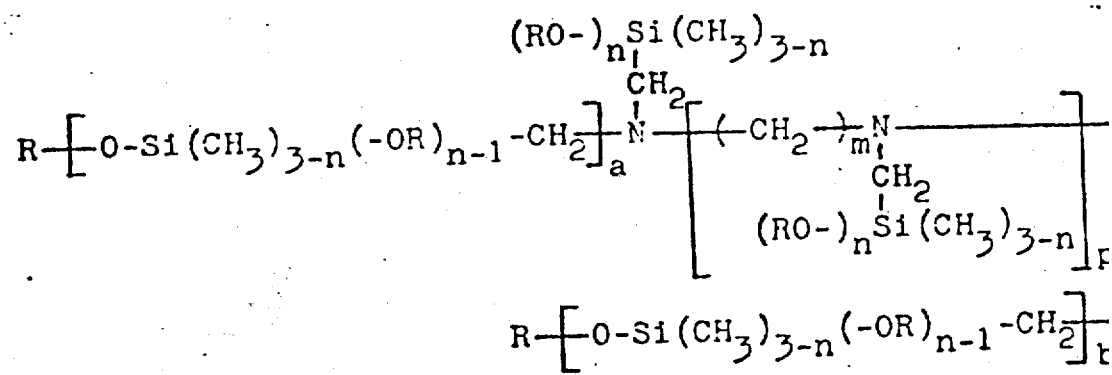

("m" does not appear in the original deed)

Col. 5, line 27, the formula should be:

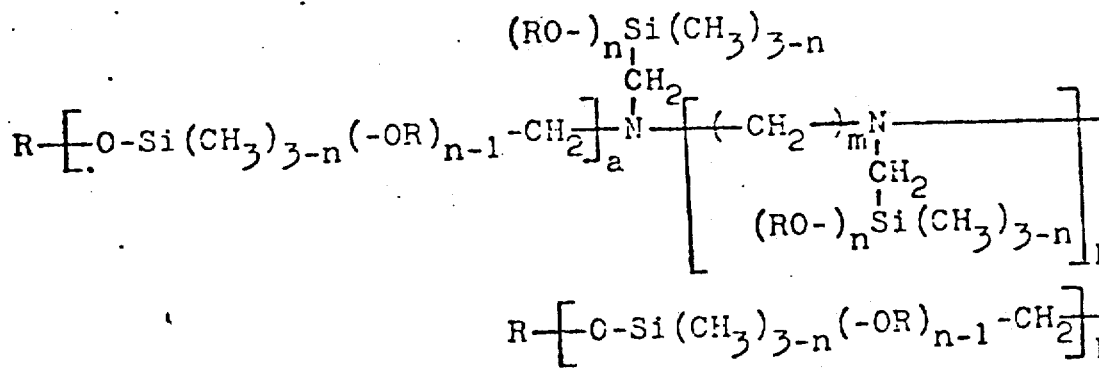

("p" appears as "a" in the original deed)

Signed and sealed this 25th day of January 1972.

(SEAL)
Attest:

EDWARD M. FLETCHER, JR.
Attesting Officer

ROBERT GOTTSCHALK
Commissioner of Patents